United States Patent
Li et al.

(10) Patent No.: US 12,533,386 B2
(45) Date of Patent: Jan. 27, 2026

(54) PREPARATION OF BLACK TEA EXTRACT WITH HIGH THEAFLAVIN CONTENT AND USE THEREOF

(71) Applicant: Huanggang Normal University, Hubei (CN)

(72) Inventors: Shiming Li, Glastonbury, CT (US); Dehe Liu, Jiangyin (CN); Jianhong Liu, Jiangyin (CN)

(73) Assignee: Jiangsu Dehe BBiological Technology Co., Ltd., Jiangyin (CN)

( * ) Notice: Subject to any disclaimer, the term of this patent is extended or adjusted under 35 U.S.C. 154(b) by 551 days.

(21) Appl. No.: 17/981,452

(22) Filed: Nov. 6, 2022

(65) Prior Publication Data

US 2024/0148817 A1 May 9, 2024

(51) Int. Cl.
| | |
|---|---|
| *A61K 36/82* | (2006.01) |
| *A61K 31/353* | (2006.01) |
| *A61P 1/16* | (2006.01) |
| *A61P 9/10* | (2006.01) |
| *A61P 13/12* | (2006.01) |

(52) U.S. Cl.
CPC ............ *A61K 36/82* (2013.01); *A61K 31/353* (2013.01); *A61P 1/16* (2018.01); *A61P 9/10* (2018.01); *A61P 13/12* (2018.01); *A61K 2236/19* (2013.01); *A61K 2236/53* (2013.01)

(58) Field of Classification Search
CPC .. A61K 36/82; A61K 31/353; A61K 2236/19; A61K 2236/53; A61P 1/16; A61P 13/12
See application file for complete search history.

(56) References Cited

U.S. PATENT DOCUMENTS

2009/0092690 A1\* 4/2009 Yang ...................... A61P 39/06
426/429

\* cited by examiner

*Primary Examiner* — Trevor Love
(74) *Attorney, Agent, or Firm* — Bin Lu

(57) ABSTRACT

Disclosed is a method of preparing black tea extract with high theaflavin content, which utilizes an enzyme solution prepared by extracting polyphenol oxidase and laccase from bergamot yam (*Dioscorea opposita* foshou) or Chinese yam (*Dioscoreae Rhizoma*). Also disclosed is a method of treating liver fibrosis or kidney injury or atherosclerosis in a subject.

6 Claims, 6 Drawing Sheets

PREPARATION OF BLACK TEA EXTRACT WITH HIGH THEAFLAVIN CONTENT AND USE THEREOF

FIELD OF THE INVENTION

The invention relates to a method of utilizing a natural product. More specifically, it relates to a method of preparing a black tea product with high theaflavin content, and methods of using the prepared black tea extract.

BACKGROUND OF THE INVENTION

Tea is one of the most consumed beverages in the world. Based on different processes of post-harvesting, tea can be classified into major types, e.g., green tea, black tea, oolong tea, etc. Among them, the consumption of black tea, traditionally made by fermentation of green tea, occupies the majority market of western countries and is gaining momentum in Asia and other regions as well. Tea offers a variety of health benefits as tea leaves are rich in polyphenols with high antioxidant activities. Two main polyphenols in black tea are catechins and theaflavins. During fermentation, green tea catechins is converted to black tea theaflavins. However, the conversion is always incomplete, leaving black tea with high amount of green tea catechins, which includes (−)-epicatechin (EC), (−)-epicatechin gallate (ECG), (−)-gallocatechin (EGC), and (−)-gallocatechin (EGCG). Typically, theaflavins are present in minimal content in black tea and its related products if they are not specifically processed.

Theaflavis, including theaflavin (TF1), theaflavin-3-O-gallate (TF2a), theaflavin-3'-O-gallate (TF2b), and theaflavin-3,3'-O,O-digallate (TF3), have a unique function as an antioxidant. Recently, theaflavins, especially the TF2a, TF2b, and TF3 monomers, collectively termed as "theaflavin mono- and digallates," have received a broad attention because of their health-promoting functions such as reducing cardiovascular and cerebrovascular diseases, inducing tumor cell apoptosis, regulating immune cell function, fighting influenza virus, HIV virus, and other diseases.

Clearly, to optimize the conversion process from green tea catechins to black tea theaflavins so to produce black tea with high theaflavin content would be important for reaping the maximum benefits from black tea and its related products. Furthermore, as research has shown that TF2 (i.e., TF2a and TF2b combined) and TF3 are more effective in bioactivities than TF1, to achieve a high percentage of theaflavin mono- and digallates in the total theaflavin would also be of importance during the same conversion.

Therefore, there is an urgent and strong need to develop a process of preparing black tea product with high theaflavin content, preferably with a high percentage of theaflavin mono- and digallates.

SUMMARY OF THE INVENTION

This invention provides a method as outlined above. Unexpectedly, the method largely relies on some naturally derived agents to deliver an effective solution.

One aspect of this invention relates to a method of preparing black tea extract with high theaflavin content. The method includes: (1) dissolving 50 g of green tea extract (GTE) in 1 L of water; (2) fermenting the GTE solution at 30-42° C. with an enzyme solution prepared by extracting polyphenol oxidase (PPO) and laccase from bergamot yam (*Dioscorea opposita* foshou) or Chinese yam (*Dioscoreae Rhizoma*), PPO and laccase concentration each being higher or equal to 0.2 mg/ml; (3) supplying oxygen or air to facilitate the enzyme-catalyzed fermentation and monitoring the fermentation by high performance liquid chromatography (HPLC); (4) concluding the fermentation when HPLC of analytical samples collected from the fermentation shows the disappearance of (−)-epicatechin (EC) and/or (−)-epigallocatechin (EGC) and/or (−)-epicatechin gallate (ECG) and/or epigallocatechin gallate (EGCG) and/or other catechins in the GTE; (5) adding 3 L of ethyl acetate to the fermentation mixture while stirring continuously; (6) separating the mixture to harvest the resulting organic layer; and (7) extracting the organic layer with 200 mL of water and concentrating in vacuo prior to lyophilization to yield a powder of black tea extract. Finally, the black tea extract thus obtained has a percentage of theaflavin mono- and digallates in the total theaflavin higher than 60%.

Advantageously, the black tea extract obtained from the above method contains at least 50 wt % of theaflavin.

Further, the black tea extract thus obtained from the above method can have a percentage of theaflavin mono- and digallates in the total theaflavin higher than 70%.

For the above preparation method, the enzyme solution can be prepared by: (i) crushing bergamot yam and Chinese yam under a supersonic condition to a fine suspension solution; (ii) centrifuging the fine suspension solution and filtering out debris to obtain a filtrate; (iii) adding ammonium sulfate to the filtrate to precipitate enzymes; and (iv) filtering the mixture over a fine filter paper (0.22 μm).

In the method described above, EC, EGC, ECG, and EGCG are substantially oxidized to theaflavins when the fermentation is concluded.

Also, during the fermentation, a buffer solution of citric acid and/or disodium hydrogen phosphate can be added to maintain pH 4.5-5.5.

Another aspect of this invention relates to a method of treating liver fibrosis or kidney injury in a subject. The method includes administering an effective amount of a composition to the subject in need thereof. In one embodiment, the composition comprises the black tea extract with high theaflavin content prepared by the method described above.

In another embodiment, the composition can contain a black tea extract having a percentage of theaflavin mono- and digallates in the total theaflavin higher than 60%. Preferably, the black tea extract just described above can have at least 50 wt % of theaflavins.

Still another aspect of this invention relates to a method of treating atherosclerosis in a subject. The method includes administering an effective amount of a composition to the subject in need thereof. Additionally, the composition includes the black tea extract with high theaflavin content prepared by the preparation method described above.

Yet another aspect of this invention relates to a method of treating atherosclerosis in a subject. The method includes administering an effective amount of a composition to the subject in need thereof and the composition comprises a black tea extract having a percentage of theaflavin mono- and digallates in the total theaflavin higher than 60%. Preferably, the black tea extract just described above can have at least 50 wt % of theaflavin.

The details of the invention are set forth in the drawing and description below. Other features, objects, and advantages of the invention will be apparent from the description and from the claims.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
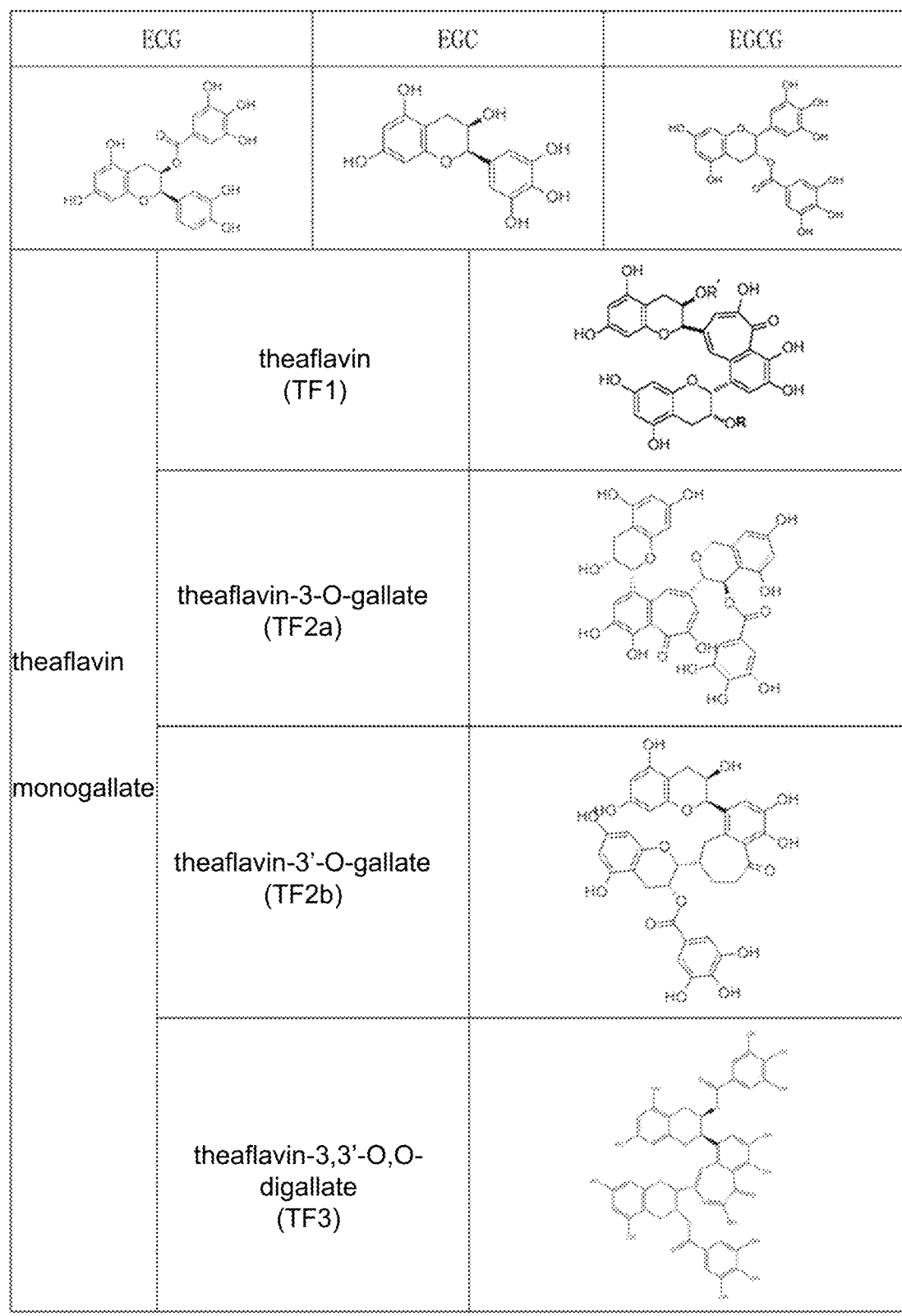
FIG. 1 shows chemical structures of four dominant theaflavins and 3 precursor catechins: (−)-epigallocatechin gallate (EGCG), (−)-epigallocatechin (EGC), and (−)-epicatechin-3-gallate (ECG).

Before the present methods are described, it is to be understood that this invention is not limited to particular method described, as such may, of course, vary. It is also to be understood that the terminology used herein is for the purpose of describing particular embodiments only, and is not intended to be limiting, since the scope of the present invention will be limited only by the appended claims.

Although the manufacturing process of black tea is traditionally termed as fermentation of green tea, it is actually an oxidation reaction first under the catalysis of polyphenol oxidase and peroxidase and followed by a polymerization of the oxidized quinones, a complete different process from microbial fermentation to produce ethanol and vinegar from crops and soy sauce from soy bean. As mentioned above, theaflavin formation undergoes oxidation and polymerization, two simplified steps (Li, S., Lo, C-Y., Pan, M-H., Lai, C-S., and Ho, C-T. 2013; Black tea: chemical analysis and stability. Food Funct., 4: 10-18.). The first step is the oxidation reaction, i.e. green tea catechins, particularly epigallocatechin (EGC) and epigallocatechin gallate (EGCG) are partially oxidized to quinones under the catalysis of polyphenol oxidase (PPO, EC1.14.18.1) and/or peroxidase (POD, EC1.11.1.7). PPO and POD exist naturally in fresh tea leaves, fruits, and vegetables.

The initial enzyme-catalyzed oxidation is a key step and the application of PPO and/or POD that are usually derived from plants or microorganisms is crucial. Many studies have found that the sources of PPO and POD play very important roles in multiple aspects, such as yields, coversion rate and composition/ratio of individual theaflavins, that is, TF1, TF2a, TF2b and TF3. Traditionally, the source from fresh green tea leaves is used in the 'fenmentation' process to make black tea. However, there are limitations to rely solely on tea PPO/POD, such as the off season time of tea harveting and low conversion yields from green tea catechins to black tea theaflavins.

It is reported that PPO has greater efficacy than POD in the catalyzing the oxidation of catechins to their corresponding quinones. Therefore, other sources of PPO have been explored from vegetables, fruits and microbes such as mushrooms (Sang, S., Lambert, J. D, Ho, C-T., and Yang, C-S. 2011. The chemistry and biotransformation of tea constituents. Pharm. Res. 64 (2): 87-99.). Examples of PPO from different sources are reported and it can be learned that the optimal conditions to obtain maximum yields of theaflavins, including temperature, pH, time, and concentration, are different from one source of enzyme to another.

Described in this invention, the resulted PPO and laccase were used for the high conversion rate of theaflavins from green tea catechins. The reason to use of these two yam species is because the PPO and laccase from the yams used can catalyze the conversion from green tea catechins to theaflavins in a high yield, i.e. high efficiency, and moreover the resulted theaflavin mixture contains high percentage of TF2 and TF3. TF2 and TF3 have been reported to have much more potent biological effects such as antioxidant, anti-inflammation, anti-liver fibrosis etc.

The black tea extract prepared as described in this invention can be used for therapeutic purposes: treating liver fibrosis or kidney injury as well as atherosclerosis in a human or animal subject.

The subject methods are useful primarily for therapeutic purposes. Thus, as used herein, the term "treating" is used to refer to both prevention of disease, and treatment of a pre-existing condition. The treatment of ongoing disease, to stabilize or improve the clinical symptoms of the patient, is a particularly important benefit provided by the present invention. Such treatment is desirably performed prior to loss of function in the affected tissues including the cardiovascular system and its surrounding tissues. For example, treatment of a cancer patient may be reduction of tumor size, elimination of malignant cells, or the prevention of relapse in a patient who has been put into remission.

The terms "inhibiting," "reducing," or "prevention," or any variation of these terms, when used in the claims and/or the specification includes any measurable decrease or complete inhibition to achieve a desired result.

On the other hand, the terms "determining," "measuring," and "assessing," and "assaying" are used interchangeably and include both quantitative and qualitative determinations.

The terms "subject," "host," "patient," and "individual" are used interchangeably herein to refer to any mammalian subject for whom diagnosis or therapy is desired, particularly humans. Other subjects may include cattle, dogs, cats, guinea pigs, rabbits, rats, mice, horses, and so on.

The terms "cell," and "cells," and "cell population," used interchangeably, intend one or more mammalian cells. The term includes progeny of a cell or cell population. Those skilled in the art will recognize that "cells" include progeny of a single cell, and there are variations between the progeny and its original parent cell due to natural, accidental, or deliberate mutation and/or change.

An "effective amount" is an amount sufficient to effect beneficial or desired clinical results. An effective amount can be administered in one or more administrations. For purposes of this invention, an effective amount of reagent antibodies is an amount that is sufficient to diagnose, palliate, ameliorate, stabilize, reverse, slow or delay the progression of the disease state.

Because of low content of theaflavin in the traditionally prepared black tea products, its potential therapeutic effects has not been fully explored. The method described in this invention would provide a black tea extract with high theaflavin content. As a result, the future availability of theaflavin-rich products would usher in a new era of realizing maximum benefits of theaflavin-based health regimen.

BEST MODE FOR CARRYING OUT INVENTION

The following example explains the present invention more concretely, but do not limit the range of the present invention.

EXAMPLES

Example 1: Preparation of a Black Tea Extract with High Theaflavin Content

Extraction of Polyphenol Oxidase (PPO) and Laccase from Bergamot Yam (*Dioscorea opposita* Foshou) or Chinese Yam (*Dioscoreae Rhizoma*)

Bergamot yam or Chinese yam were crushed under a supersonic condition to a fine suspension solution, which was centrifuged and filtered to obtain a filtrate. To the filtrate, ammonium sulfate was added to precipitate the enzymes. After filtration over a fine filter paper (0.22 μm) or other membrane filter, the mixture of crude PPO and laccase was obtained to prepare an enzyme solution. Two enzyme solutions, one from bergamot yam and the other from Chinese yam, were prepared. PPO and laccase concentration each is higher or equal to 0.2 mg/ml;

Preparation of Green Tea Extract 2000 g dried green tea leaves were added into 10 L of water, and the mixture was refluxed for 2 h under $N_2$ prior to filtration. The solid residue was extracted two more times with water and the combined filtrate was concentrated in vacuo to dryness, yielding green tea extract (GTE).

Fermentation to Convert Green Tea Extract to Black Tea Extract 50 g GTE was dissolved in 1 L of water and mixed with the previously prepared enzyme solution in a container maintained at 30° C. Oxygen or air was introduced to facilitate the enzyme-catalyzed reaction, which was monitored by high performance liquid chromatography (HPLC). Analytical samples were collected from the fermentation container every 15 min until the fermentation process was essentially complete, marked by the disappearance of EC and/or EGC and the increased percentage of TFs from HPLC.

The total period of time of fermentation was 90 min but could vary between 1 and 2 h, depending on the actual test results. Oxygen was terminated after 90 min, and 3 L of ethyl acetate was added into the reaction mixture while stirring continuously. Ethyl acetate was separated out and another extraction with ethyl acetate (1 L) was performed. The resulting organic layer was combined, extracted with water (200 mL), and concentrated in vacuo prior to lyophilization to yield a dark brown powder (40 g).

The solid product was collected and analyzed by HPLC and the results, i.e., the conversion yield of theaflavin and the ratios of TF1, TF2a, TF2b, and TF3, are listed in the table below. Data were compared with conversion using enzymes from *Camellia sinensis* from a previous study. See Li (2006). Study on Theaflavins Synthesis by Screening and Using Microorganism Polyphenol Oxidase. Dissertation, Hunan Agricultural University, Changsha, China.

TABLE 1

Yield of conversion and content of individual theaflavins using crude enzymes from different sources

| source | TF1 (%) (% in total TFs) | TF2a (%) (% in total TFs) | TF2b (%) (% in total TFs) | TF3 (%) (% in total TFs) | Total TFs of conversion (%) (total TFs, 100%) | Reference |
| --- | --- | --- | --- | --- | --- | --- |
| *Camellia sinensis* | 9.25% (46.2%) | 2.55% (12.7%) | 3.71% (18.5%) | 4.50% (22.5%) | 20.0% (100%) | Li, 2006 |
| Chinese yam (*Dioscoreae Rhizoma*) | 5.85% (11.7%) | 18.49% (37.0%) | 5.68% (11.4%) | 19.94% (39.9%) | 50.0% (100%) | This invention |
| bergamot yam (*Dioscorea opposita foshou*) | 5.54% (9.1%) | 19.75% (32.5%) | 6.35% (10.4%) | 18.97% (31.2%) | 50.7% (100%) | This invention |

The percentage of theaflavin mono- and digallates in the total theaflavin can be summarized as follows:

Using enzymes from *Camellia sinensis*: 53.7%

Using enzymes from Chinese yam: 88.3%

Using enzymes from bergamot yam: 74.1%

Example 2: Evaluation of Protective Effects of Black Tea Extract in CCl4-Induced Rat Liver and Renal Injury Animal Experiments Forty female Sprague-Dawley (SD) rats, aged 6-7 weeks, were randomly divided into five groups after a week of adaptive feeding. The rats were given free access to a normal commercial laboratory rodent diet 5001 and ddH2O throughout the experiment under a controlled temperature of 25±1° C. and a 12/12 h light-dark cycle. All animal experiments were performed in accordance with the Guidelines for the Care and Use of Laboratory Animals, Ministry of Science and Technology, China. This study was approved by the Animal Care and Scientific Committee of Huanggang Normal University, Hubei, China.

Black tea extract (BTE) prepared from the previous different enzyme reaction was used in the study. Rats in the control group (CON) received an intraperitoneal (IP) injection of corn oil (0.1 mL/100 g BW of rats); rats in other groups had IP injections with a CCl4 mass concentration of 40% dissolved in corn oil (0.1 mL/100 g BW of rats). The CON rats were PO gavaged with ddH2O daily. The CCl4-treated group (CCl4) rats were PO gavaged with ddH2O daily. The silymarin-treated (treatment group, CCl4+Sil) rats were PO gavaged with silymarin (20 mg/kg BW of rats) daily. The BTE-treated group rats were PO gavaged with BTE (100 mg/kg BW of rats, CCl4+BTE100; 300 mg/kg BW of rats, CCl4+BTE300) daily. After 8 weeks of continuous administration and 24 h fasting, all experimental rats were sacrificed by CO2 asphyxiation.

Histological and Immunohistochemistry Analyses

To observe the pathological symptoms of liver and kidney tissues, the paraffin sections of the liver and kidney tissues were stained with hematoxylin and eosin (H&E, Sigma-Aldrich) and Sirius red (Sigma-Aldrich). The specimens were fixed in 10% (V/V) neutral formalin for 24 h, embedded in paraffin, and then sliced into 5 μm thick tissue sections. H&E and Sirius red staining was carried out according to the standard protocols. After staining, pathological changes were observed at 200× magnification under a BH2 optical microscope (Olympus, Hino, Tokyo, Japan). The fibrosis degree was rated into five levels by three experienced pathologists, independently, with reference to the METAVIR scoring system according to our previous research: absence of fibrosis (S0); perisinusoidal or portal fibrosis (51); fiber septal formation and preservation of the hepatic lobular structure (S2); fiber septum formation and destruction of the hepatic lobular structure (S3); and early cirrhosis (S4)

Biochemical Analysis

Determination of the serum levels of alanine transaminase (ALT), aspartate aminotransferase (AST), glutathione (GSH), superoxide dismutase (SOD), and malondialdehyde (MDA). The liver tissue homogenate was prepared by grinding with normal saline in an ice bath and centrifuging for 10 min at 1107 g. ALT, AST, GSH, SOD, and MDA levels in the supernatant were determined using commercial detection kits (Nanjing Jiancheng Bio., Nanjing, Jiangsu, China). Absorbance was measured on an MK3 microplate reader (Thermo Fisher).

Quantitative Real-Time (RT) Polymerase Chain Reaction (PCR)

Total RNA was purified from 50 mg of the homogenized liver tissue using the TRIzol reagent (Ambion, TX) and then transcribed into cDNA using an Advantage RT-for-PCR Kit (Clontech, Palo Alto, CA) according to the manufacturer's protocol. A quantitative realtime PCR was performed in a Bio-Rad Real-Time PCR System (Bio-Rad, Hercules, CA) using an SYBR Green Master Mix (Kapa Biosystems, Wilmington, MA).

ELISA & Western Blot

The collected blood samples were centrifuged at 277 g for 10 min to obtain the serum. The contents of TNF-α (Cat #RA20035), TGF-β (Cat #RA20080), and IL-17 (Cat #RA20117) in serum were detected according to the kit instructions given with the kit of Bio-Swamp (Wuhan, Hubei, China). The optical density (OD) value of each well at a wavelength of 450 nm was read immediately using a microtiter plate reader (LabSystems, Helsinki, Finland).

The liver and kidney tissues of each experimental rat were collected. With the addition of a 6-fold volume of RIPA pyrolysate (BioVision Inc., Cat #: 2114) and 1% PMSF (BioVision Inc., Cat #: 1548), the tissues were homogenized and centrifuged at 4° C. and 492 g for 15 min. The supernatant was harvested for western blot analysis according to routine laboratory methods. The primary antibody catalog numbers used in this study were a-SMA (abcam, Cambridge, MA, ab5694), TGF-β (abcam, ab92486), ERK1/2 (abcam, ab17942), p-ERK1/2 (CST, 4376S), Smad1 (abcam, ab63356), Smad2 (abcam, ab40855), p-Smad1 (abcam, ab73211), p-Smad2 (abcam, ab40855), GAPDH (CST, 2110), and secondary HRP-conjugated antibodies (abcam, ab6721).

Statistical Analysis

Mathematical statistical analysis was performed with SPSS (SPSS version 17.0, SPSS Science, Chicago, IL) software, and the graphs were plotted with Excel 2007. The experimental results were represented as the mean±SD. The measurement data were compared with one-way analysis of variance (one-way ANOVA) and Ducan's multiple-range test. A p-value of less than 0.01 ($p<0.01$) was considered to indicate statistical significance.

Results

Figure 2:
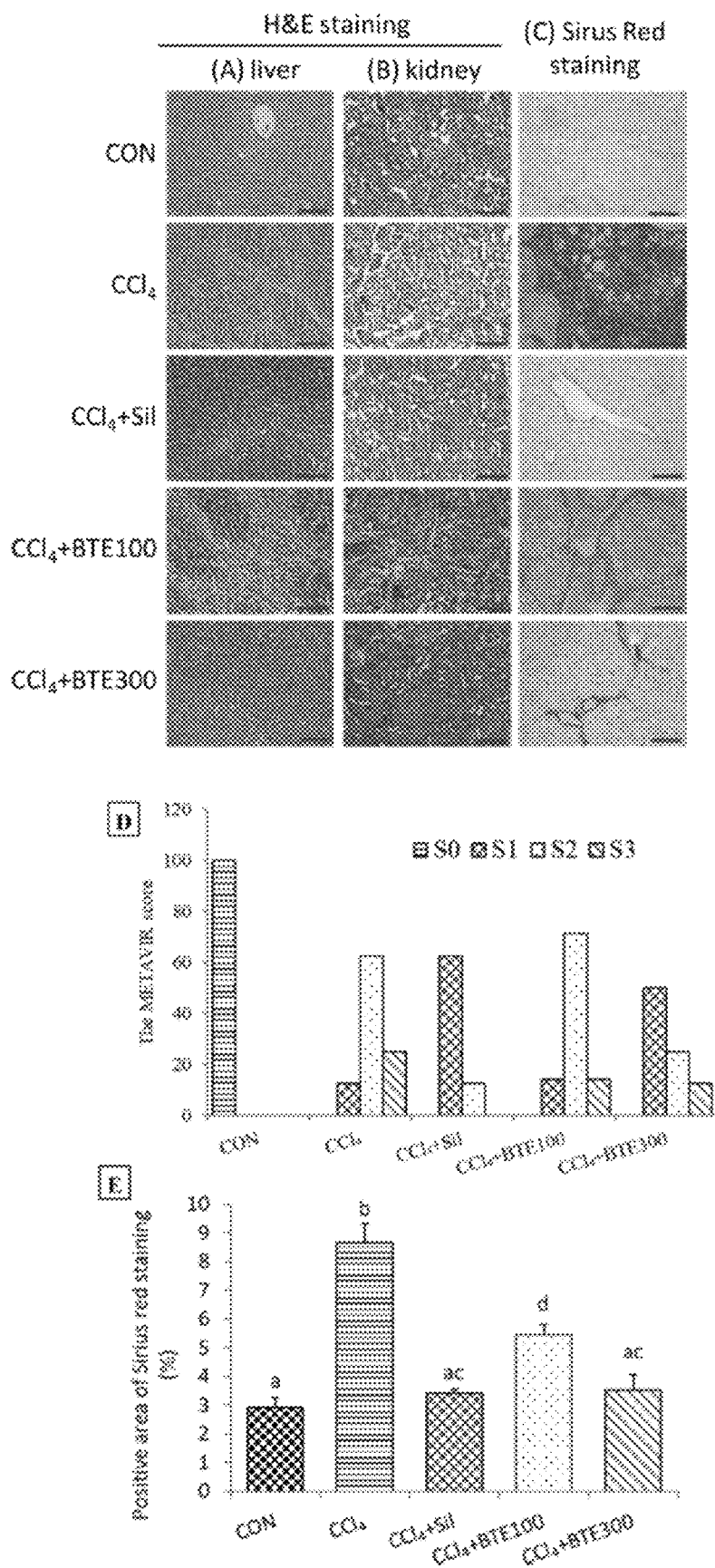
FIG. 2 shows H&E and Sirius red staining on the liver tissue: hematoxylin and eosin staining ((A) liver, (B) kidney); (C) Sirius red staining; (D) the METAVIR score from H&E (S0=absence of fibrosis; S1=perisinusoidal or portal fibrosis; S2=fiber septal formation and preservation of the hepatic lobular structure; S3=fiber septum formation and destruction of the hepatic lobular structure); and (E) the positive area of Sirius Red staining. All slides are based on the examination of five different fields at 200× magnification. The results are expressed as the mean±SEM; the scale bar represents 200 µm. Different letters (a-c) represent significant differences in the same indexes of the different groups when $p<0.01$.

In FIG. 2, the color of the liver and kidney tissues in the control group was normal, but the surfaces of the liver and kidney tissues in the model group turned white with light-colored patterns. The morphology of glomeruli was normal, and the structure of the hepatic lobule was complete. In the CCl4-treated group, there were red fiber bands in the liver tissue, balloon-like degeneration, steatosis, and necrosis of hepatocytes, more inflammatory cell infiltration, and no obvious changes in the glomerular structure. However, a large number of renal tubules were found to be narrowed, and the epithelial cells of the wall were turbid and swollen. The results of Sirius red staining (FIG. 2C, 2E) showed that CCl4 treatment increased the fibrosis degree of the liver. After BTE treatment, the whitening of the liver surface decreased. The METAVIR grading evaluation results (FIG. 2D) showed that compared with the CCl4-treated group, the S3 phase of hepatic fibrosis decreased and the S2 phase increased after the treatment of BTE. The above results revealed that the pathological changes in the liver and kidney tissues increased upon the treatment with BTE.

Figure 3:
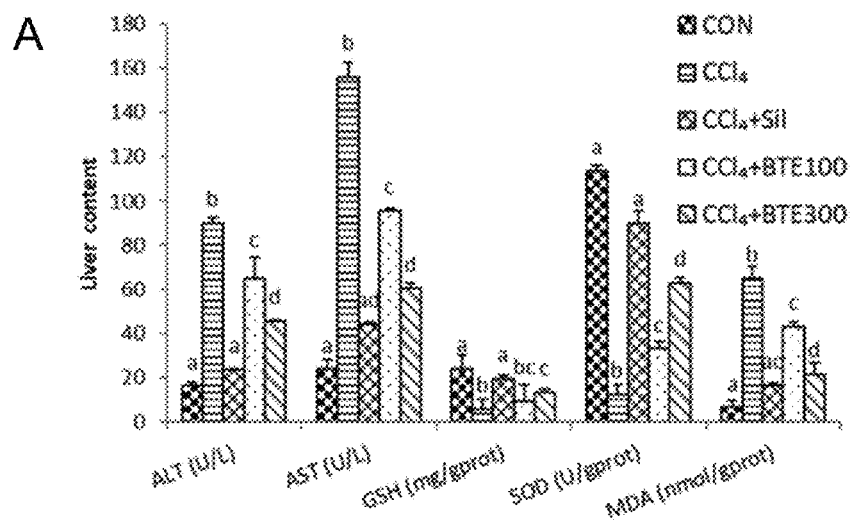
FIG. 3 lists data showing improved liver functions and attenuated oxidative stress. (A): ALT (U/L), AST (U/L), GSH (mg/gprot), SOD (U/gprot), and MDA (nmol/gprot) in the liver homogenate were measured using a commercial assay kit (n=3, mean±SD). Different letters (a-d) represent significant differences in the same indexes in different groups when $p<0.01$. (B): TNF-α, IL-17, and TGF-β in serum was measured by the ELISA assay (n=3, mean±SD). Different letters (a-e) represent significant differences in the same indexes of the different groups when $p<0.01$. (C): Expression level of TGF-β in the liver and kidney tissues was detected by the western blot relative to GAPDH in three independent experiments. Different letters (a-d) represent significant differences in the same indexes of different groups when $p<0.01$.
Figure 3:
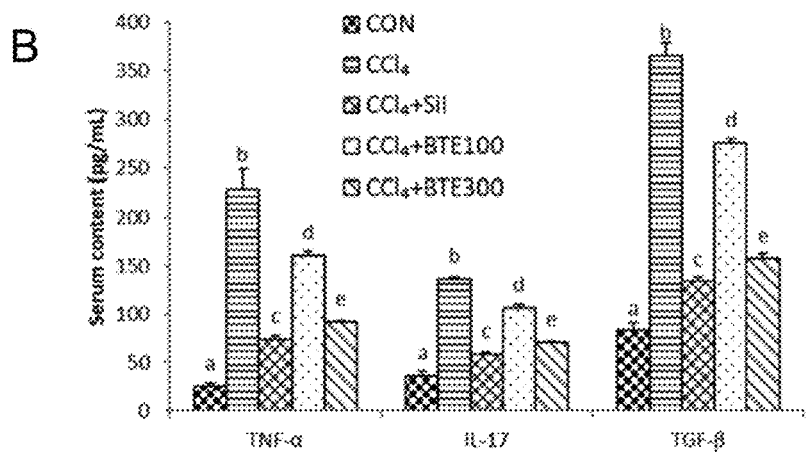
Figure 3:
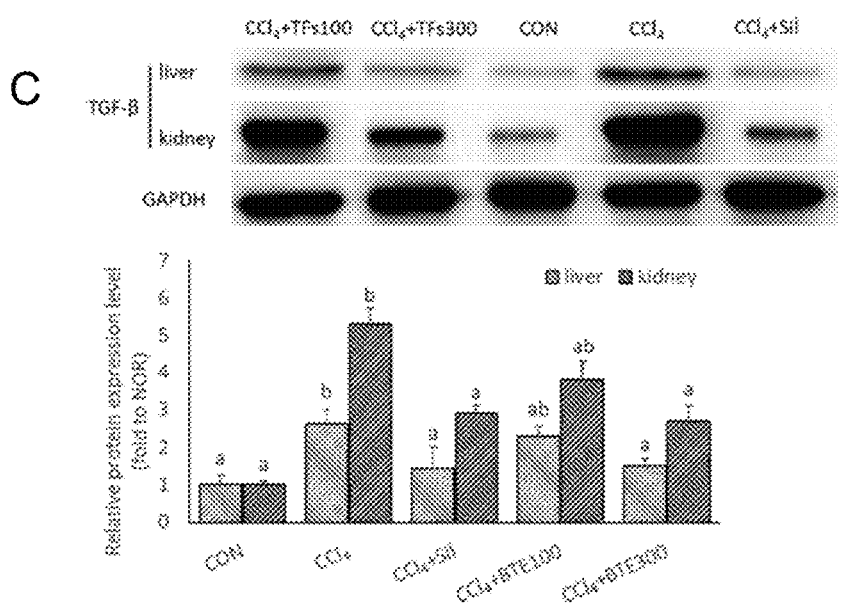

FIG. 3 (A) shows BTE improved liver functions and attenuated oxidative stress. Compared with the CCl4-treated group, the contents of ALT, AST, and MDA were reduced to 50.7, 38.6, and 33.1%, respectively, after coadministration of 300 mg/kg BW of BTE, the GSH content was 1.69-fold higher, and the enzyme activity of SOD was 2.65-fold higher than that of the CCl4-treated model group. Compared with the CCl4+Sil group, there were significant differences between BTE treatment and silymarin treatment in each index value. These results suggested that BTE alleviated CCl4-induced liver oxidative damage and played the role of protecting the liver.

FIG. 3 (B) demonstrated that the serum proinflammatory cytokine levels of TNF-α, IL-17, and TGF-β in the CCl4-treated group increased significantly compared to those in the CON group. It revealed that BTE prevented the formation of hepatic fibrosis by reducing the expression of inflammatory factors.

FIG. 3 (C) revealed that with the stimulation of CCl4, the expression levels of TGF-β1 were upregulated by 2.6-fold (liver) and 5.3-fold (kidneys) compared to those of the control group. The expression levels of TGF-β1 after the BTE treatment decreased to 2.3-fold (100 mg/kg BW, liver), 1.5-fold (300 mg/kg BW, liver), 3.8-fold (100 mg/kg BW, kidneys), and 2.7-fold (300 mg/kg BW, kidneys) compared with those of the control group. This indicated that CCl4 treatment leads to the fibrosis of both the liver and kidney tissues, and BTE reduced the liver and kidney injury caused by CCl4; this inhibitory effect occurred in a dose-dependent manner.

Figure 4:
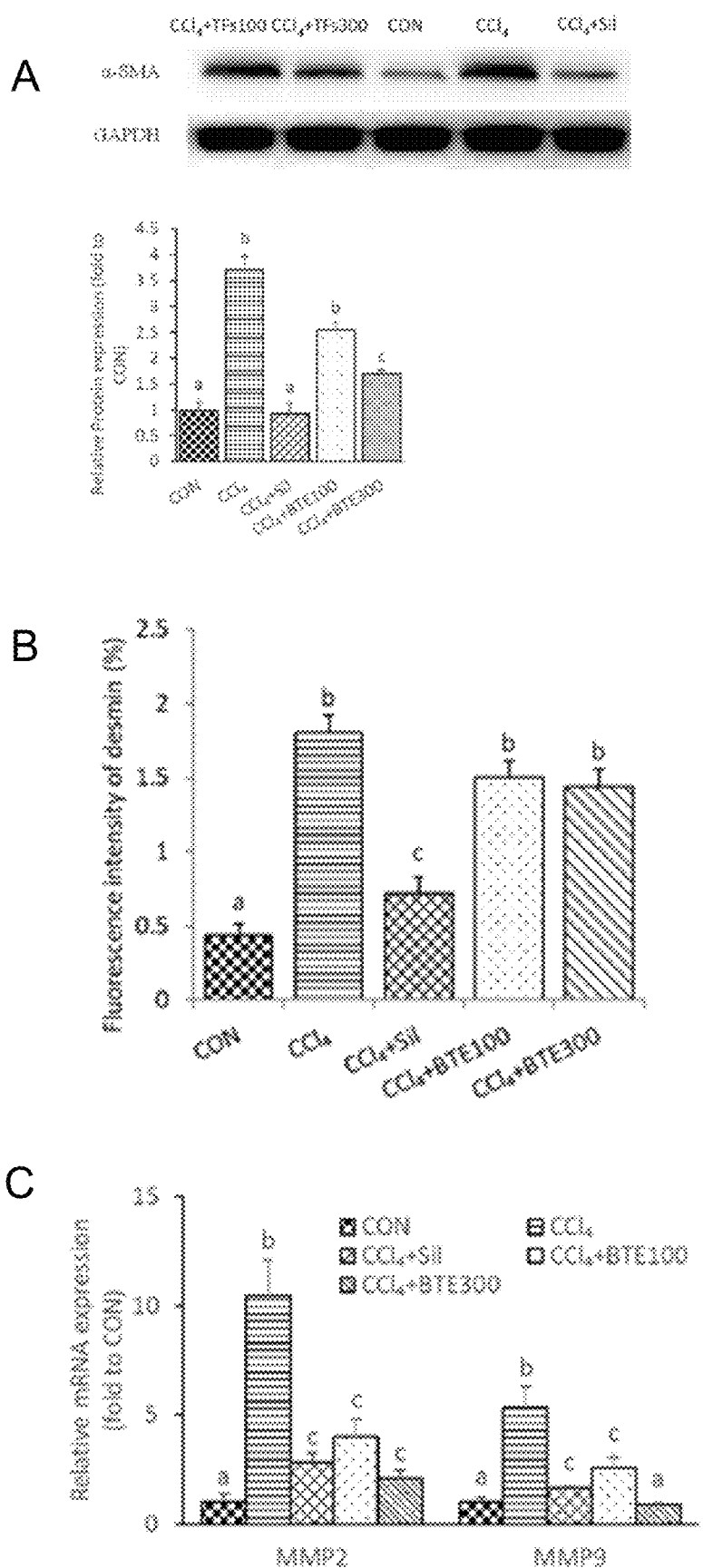
FIG. 4 presents data showing inhibited the activation of hepatic stellate cells (HSCs) in the liver. (A) the expression level of the α-SMA protein was detected by the western blot; (B) the level of desmin was detected by immunofluorescence and then qualified by the fluorescence intensity in every field; (C) relative mRNA levels of hepatic MMP-2 and MMP-9 were measured by real-time polymerase chain reaction (RT-PCR); and (D) values are expressed as the mean±SD, n=3. The scale bar represents 200 µm. Different letters (a-c) represent significant differences in the same indexes in different groups when $p<0.01$.

BTE inhibited the activation of hepatic stellate cells: from the western blot shown in FIG. 4A, the results revealed that a-SMA was less expressed in the BTE group compared to that in the CCl4 group. In addition, as another marker of the activated HSCs, desmin was less detected by immunostaining (FIG. 4B). The desmin fluorescence intensities of CON, CCl4, CCl4+BTE100, and CCl4+BTE300 groups are 0.44, 1.80, 1.51, and 1.44%, respectively, but there is a striking difference in silymarin coadministered (with a value of 0.72%). These results suggest that BTE inhibited lamin expressions in HSC cells. Moreover, MMP-2 and MMP-9 mRNA levels (FIG. 4C) sharply increased in the CCl4 group, whereas they were significantly reduced by the intervention of BTE.

Figure 5:
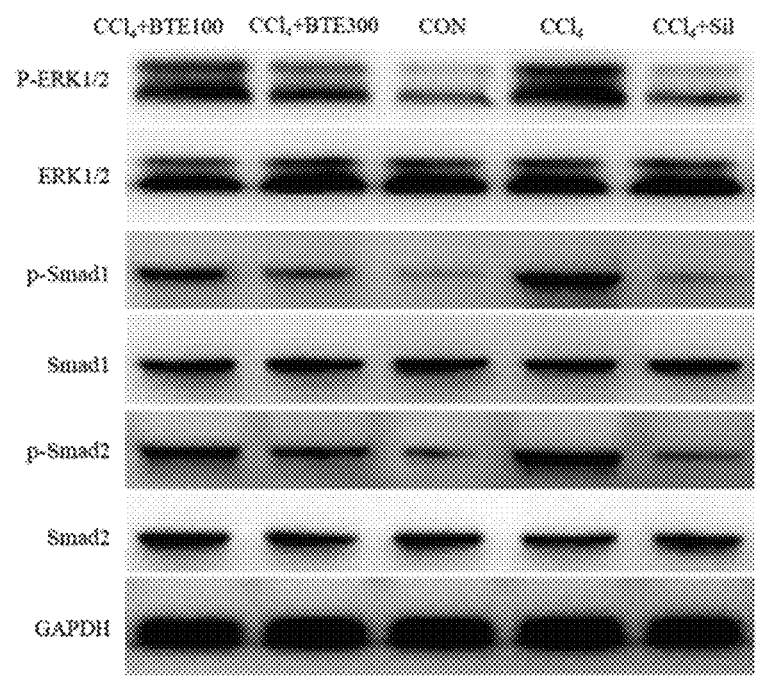
FIG. 5 shows data related to expression levels of p-Smad1/2, Smad1/2, p-ERK, and ERK in the liver were detected by the western blot relative to GAPDH in three independent experiments. Different letters (a-d) represent significant differences in the same indexes of the different groups when $p<0.01$.
Figure 5:
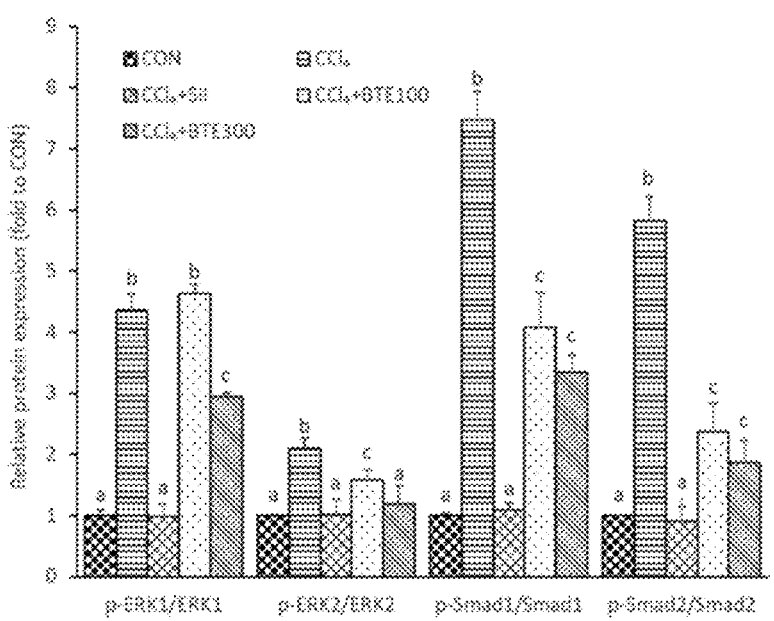

The western blot results (FIG. 5) showed that the relative expression values of p-ERK1/ERK1, p-ERK2/ERK2, p-Smad1/Smad1, and p-Smad2/Smad2 proteins in liver tissues induced by CCl4 were 4.4-, 2.1-, 7.5-, 5.8-fold, respectively, higher than those in the control group. After coadministration with a dose of 300 mg/kg BW of BTE, the relative expression values of these proteins were reduced to 68, 56, 44, and 32%, respectively, compared with those of the CCl4-treated group, suggesting that BTE alleviated the phosphorylation levels of ERK and Smad by downregulating the expression of TGF-β.

Example 3: Evaluation of Therapeutic Effects of Theaflavin in Atherosclerosis Mouse Models Animal Experiments Twenty four model male ApoE−/− (ApoE-KO) mice were fed a high fat diet for 6 weeks to develop established atherosclerosis. At 8 weeks of age, they were divided into 4 treatment groups: control, high fat diet, 2.5 mg theaflavin treatment, and 7.5 mg theaflavin treatment. 8 weeks after commencement of the study, ApoE-KO mice were anaesthetized. All animal experiments were performed in accordance with the Guidelines for the Care and Use of Laboratory Animals, Ministry of Science and Technology, China. This study was approved by the Animal Care and Scientific Committee of Huanggang Normal University, Hubei, China.

Histological Analyses

Figure 6:
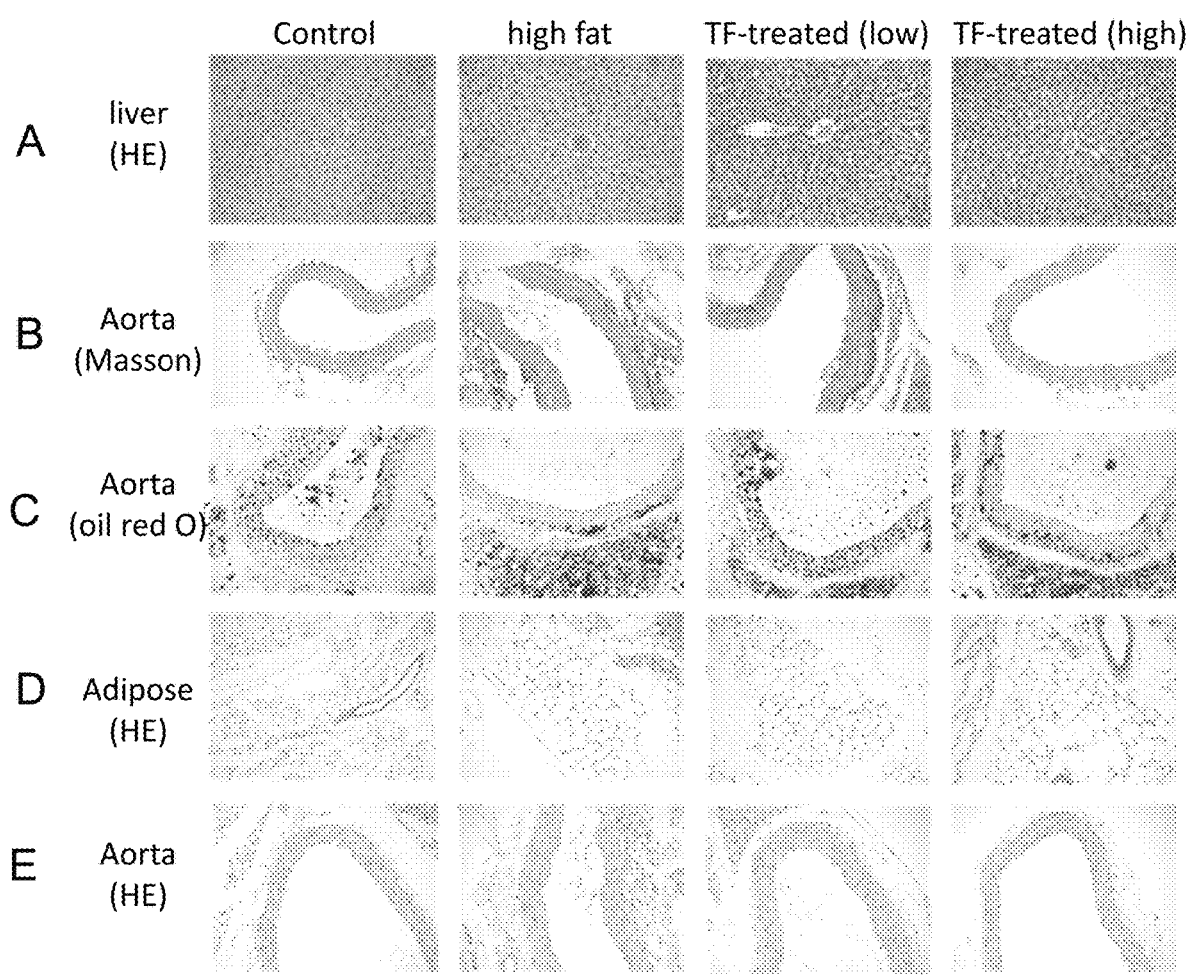
FIG. 6 shows a study of using atherosclerosis animal model with theaflavin. Histology analyses are shown in (A) liver with HE staining, (B) aorta with Masson staining, (C) aorta with oil red O staining, (D) adipose with HE staining, and (E) aorta with HE staining.

As shown in FIGS. 6B, 6D, and 6E, theaflavin treatment, especially with high dose of 7.5 mg, could reverse some of the tissue damages observed in the high fat diet group, revealing some therapeutic effects towards atherosclerosis in the mouse models.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of preparing black tea extract with high theaflavin content, comprising:
    dissolving 50 g of green tea extract (GTE) in 1 L of water;
    fermenting the GTE solution at 30-42° C. with an enzyme solution prepared by extracting polyphenol oxidase (PPO) and laccase from bergamot yam (*Dioscorea opposita* foshou) or Chinese yam (*Dioscoreae Rhizoma*), wherein PPO and laccase concentration each is higher or equal to 0.2 mg/ml;
    supplying oxygen or air to facilitate the enzyme-catalyzed fermentation and monitoring the fermentation by high performance liquid chromatography (HPLC);
    concluding the fermentation when HPLC of analytical samples collected from the fermentation shows the disappearance of (−)-epicatechin (EC) and/or (−)-epigallocatechin (EGC) and/or (−)-epicatechin gallate (ECG) and/or epigallocatechin gallate (EGCG) and/or other catechins in the GTE;
    adding 3 L of ethyl acetate to the fermentation mixture while stirring continuously;
    separating the mixture to harvest the resulting organic layer; and
    extracting the organic layer with 200 mL of water and concentrating in vacuo prior to lyophilization to yield a powder of black tea extract, wherein the black tea extract thus obtained has a percentage of theaflavin mono- and digallates in the total theaflavin higher than 60%.

2. The method of claim 1, wherein the black tea extract thus obtained comprises at least 50 wt % of theaflavin.

3. The method of claim 1, the black tea extract thus obtained has a percentage of theaflavin mono- and digallates in the total theaflavin higher than 70%.

4. The method of claim 1, wherein the enzyme solution is prepared by:
    crushing bergamot yam and Chinese yam under a supersonic condition to a fine suspension solution;
    centrifuging the fine suspension solution and filtering out debris to obtain a filtrate;
    adding ammonium sulfate to the filtrate to precipitate enzymes;
    and filtering the mixture over a 0.22 μm filter paper.

5. The method of claim 1, wherein EC, EGC, ECG, and EGCG are substantially oxidized to theaflavins when the fermentation is concluded.

6. The method of claim 1, wherein during the fermentation, a buffer solution of citric acid and/or disodium hydrogen phosphate is added to maintain pH 4.5-5.5.

* * * * *